(12) United States Patent
Weik, III et al.

(10) Patent No.: US 7,146,345 B2
(45) Date of Patent: Dec. 5, 2006

(54) PARKING BARRIER WITH ACCIDENT EVENT LOGGING AND SELF-DIAGNOSTIC CONTROL SYSTEM

(76) Inventors: Martin Herman Weik, III, 2032 N. Taylor St., Arlington, VA (US) 22207; Paul Michael Brown, 1980 Upshur St., NW., Washington, DC (US) 20011; David Johan Van Tuyl, 70 Holland River Blvd., Holland Landing, Ontario (CA) L9N 1C3

( * ) Notice: Subject to any disclaimer, the term of this patent is extended or adjusted under 35 U.S.C. 154(b) by 0 days.

(21) Appl. No.: 10/131,029

(22) Filed: Apr. 25, 2002

(65) Prior Publication Data

US 2002/0170685 A1 Nov. 21, 2002

Related U.S. Application Data

(63) Continuation-in-part of application No. 09/644,901, filed on Aug. 24, 2000, now Pat. No. 6,484,784.

(51) Int. Cl.
*G06F 17/00* (2006.01)
(52) U.S. Cl. .................. 705/418; 705/7; 340/932.2; 160/188; 49/26; 49/49
(58) Field of Classification Search ............ 160/1, 160/4, 133, 188; 49/35, 49, 26, 27; 340/938, 340/941, 932.2; 705/7, 418
See application file for complete search history.

(56) References Cited

U.S. PATENT DOCUMENTS 3,989,932 A * 11/1976 Koerner ................. 340/938
5,034,739 A * 7/1991 Gruhl ................... 340/932.2
5,228,492 A * 7/1993 Jou ..................... 160/188
5,323,151 A * 6/1994 Parsadayan ............. 340/933
5,414,624 A * 5/1995 Anthonyson .............. 701/1
5,729,101 A * 3/1998 Richmond et al. ....... 318/282
5,828,302 A * 10/1998 Tsutsumi et al. ........ 340/540
6,329,930 B1 * 12/2001 Parsadayan ............. 340/933
6,945,303 B1 * 9/2005 Weik, III ............... 160/188
2003/0014316 A1 * 1/2003 Pratt et al. .............. 705/21

\* cited by examiner

*Primary Examiner*—Blair M. Johnson
(74) *Attorney, Agent, or Firm*—Birch, Stewart, Kolasch & Birch, LLP

(57) ABSTRACT

A parking area entrance or exit barrier includes a control system which receives inputs from various accessories associated with the operation of the barrier, and which provides control signals to the various accessories of the barrier. One of the accessories includes a sensor attached to the barrier. The sensor senses an accident event, such as contact between the barrier and a vehicle. Whenever an accident event is sensed, the control system creates an accident event log of information concerning the accident event. The accident event log may include video images of the barrier, a position of the barrier, a movement direction and speed of the barrier, and an approximated speed of the vehicle. The control system may also monitor a performance of the various accessories of the barrier and create a performance log relating to any malfunction of the accessories. The performance of the accessories may also indicate tampering or fraudulent activities concerning the parking barrier, such as an attendant stealing parking fees. The accident event log and/or performance log may be transmitted to a central service facility. Further, the central service facility can remotely change operating parameters of the control system.

6 Claims, 7 Drawing Sheets

PARKING BARRIER WITH ACCIDENT EVENT LOGGING AND SELF-DIAGNOSTIC CONTROL SYSTEM

This application is a continuation-in-part of U.S. application Ser. No. 09/644,901, filed Aug. 24, 2000, now U.S. Pat. No. 6,484,784, issued Nov. 26, 2002, the entire contents of which are hereby incorporated by reference.

BACKGROUND OF THE INVENTION

1. Field of the Invention

The present invention relates to a device for controlling and monitoring one or more entrances or exits of one or more controlled parking areas.

2. Description of the Relevant Art

Automated, motor-driven barriers, such as overhead rolling doors or gates, which close access to, and/or exit from, parking areas, are common in society. For example, a public parking lot or enclosed parking garage usually includes a gate or door (hereinafter collectively referred to as a barrier) at each entrance and at each exit. Typically, the barrier is closed. When a person driving a vehicle desires to enter or exit the parking area, the barrier is opened if certain conditions are met, e.g., a fee is paid, a valid pass is presented, an identification is made. Such barriers suffer many drawbacks.

One of these drawbacks concerns property damage and liability claims, which may occur when a vehicle comes into contact with a barrier. For example, it sometimes happens that contact occurs between a vehicle's rooftop, hood or trunk and a lower, leading edge of a barrier. When the parking attendant and/or the authorities arrive at the scene, there is little or no evidence of what actually caused the accident. Usually, there is only a damaged vehicle sitting under a damaged parking barrier.

When such an event occurs, a typical assertion by the owner of the car is: "I waited until the barrier was completely open. Then, I slowly drove my car under the barrier, when suddenly the barrier fell onto the roof of my new car causing great damage to my property and my person. You'll hear from my attorney." Often, the truth of the matter would have been more accurately stated: "I had just left a cocktail party, and I was running late for a movie. When I saw the parking barrier start to open, I gunned my car toward the exit. I'm sorry, but I drove into the parking garage's barrier."

Therefore, there exists a need in the art for a control system for a parking area barrier, which can generate an accident event log. Such an accident event log could shed light onto the circumstances surrounding accidents involving parking area barriers and vehicles.

Another drawback concerns diagnosing the operation and performance of the parking barrier. Each year, parking service providers must allocate large budgets for parking barrier repairs and service calls. Common faults include malfunctioning card readers, vehicle sensors, guide systems, motor systems, etc.

If the parking barrier is unmanned, the fault may go unrecognized by the service provider for some length of time (especially if the barrier remains in the open position). Customers will enter or exit by the barrier freely, and would be unlikely to report the malfunction. This situation results in a loss of revenue.

Alternatively, if the parking barrier is manned, the malfunctioning of the barrier may be observed very quickly. However, there is still a drawback. Typically, different repair service companies repair different faults. For example, a faulty parking card reader might be serviced by a different company than a faulty door actuator.

Unfortunately, when a parking barrier fails, the parking lot attendant usually lacks the technical expertise to determine the source of the failure. Therefore, it is common to instruct the parking lot attendant to call all of the various service companies to ensure that operation of the parking barrier will be restored quickly. Of course, this is a waste of resources, since one or more of the service companies responding to the call will have no fault to repair, and will, nonetheless, bill the parking service provider for the service call.

Therefore, there exists a need in the art for a control system, which will automatically monitor and report the performance of various components of a parking barrier. Further, there is a need in the art for a control system that will diagnose the source of a parking barrier failure to an individual sub-system(s) or component(s) so that only the proper service company will be alerted. Further, there is a need for a control system which can disable certain defective components of a parking barrier, so that the parking barrier can continue to remain functional, although not fully functional. Further, there is a need for a control system which will periodically remind authorized personal that defective components have been disabled.

Another drawback concerns employee fraud. A common sensor employed in conjunction with a parking barrier is an embedded loop sensor. The loop sensor detects metal, presumably a vehicle passing by the barrier. Therefore, the barrier will remain open so long as metal (presumably, the vehicle) is proximate the barrier. Parking area attendants have been known to place a metal plate or plates over the loop sensor(s) so as to trick the system into thinking that a vehicle remains proximate to the parking barrier (e.g. a vehicle has stalled under the barrier).

The parking area attendant then vigilantly stands by the barrier, which remains open. Each time a vehicle approaches the barrier, the attendant collects the appropriate parking fee and allows the vehicle to pass by the open barrier. The collected fees are pocketed by the attendant.

The theft is difficult to detect since conventional auditing systems simply count the number of times the barrier is cycled (i.e. opened and closed), in order to determine the anticipated parking revenues. Since the barrier remains opens as multiple vehicles pass, the parking fees, pocketed by the attendant, are not anticipated by the parking service provider.

Another method employed by parking attendants to steal parking revenue involves card readers. Many parking area pay stations include a card reader which accepts a date/time stamped parking card. Sometimes the card reader "locks-up" or "freezes-up." In other words, the software program stops, because the programming parameters arrive at a state in a state diagram which is undefined, due to erroneous parameters. The program can not proceed. State diagram errors can be sporadic, and are often due to bugs in the original program, noisy power supplies, interference, aging memory devices, etc.

Whenever a card reader "locks-up" or "freezes-up," the card reader will no longer read data from a parking card. A conventional control system requires a manual reboot to return the card reader to an initial/startup state, so that the card reader is again functional. To perform the manual reboot, a wire or wiring harness is momentarily unplugged, or a reboot or reset switch is activated. As part of the initial/startup process, a pulse is sent to the barrier actuator causing the actuator to open the barrier.

To defraud the parking service provider, the attendant will place an "out of order" sign over the card reader, and will ask the vehicle operator to handover the date/time stamped card. The parking attendant will collect a parking fee, and then press the reset switch causing the barrier to open. The parking fee will be pocketed by the attendant and the date/time stamped card will be disposed of. Again, the fraud will be difficult to detect using conventional auditing systems, since the resetting of the card reader does not increment the cycle count for the barrier, which is used to audit the fees collected by the attendant.

To prevent this type of fraud, many parking service providers do not provide a manual reboot switch or access to the wiring harness, which can reset the card reader. However, this solution is problematic. If the card reader locks-up, the attendant will be unable to reboot the card reader. The attendant will have to wait until a service technician or a manager can arrive to perform the reboot process. This will inconvenience the parking customers if they are forced to wait, or result in lost revenues if the parking customers are allowed to exit without paying. Therefore, there exists a need in the art for a control system, which detects fraudulent activity by a parking attendant.

SUMMARY OF THE INVENTION

It is an object of the present invention to address one or more of the drawbacks associated with the background art.

It is an object of the present invention to provide a control system, which can automatically detect an accident event, such as contact between a vehicle and a parking barrier.

It is an object of the present invention to provide a control system, which can automatically report an accident event concerning a parking barrier.

It is an object of the present invention to provide a control system, which can monitor, collect, store, and/or provide information concerning circumstances existing prior to, during and/or after an accident event.

It is object of the present invention for the control system to monitor, collect, store, and/or provide information such as:

1. Video images of the parking barrier before, during and/or after the accident event;
2. A movement direction, position, and/or movement speed of the barrier, when the accident event occurred;
3. An estimated speed (albeit not a true speed) of the vehicle when the accident event occurred;
4. Identification information concerning the vehicle or driver which activated the parking barrier prior to the accident event; and/or
5. Date and time information concerning the accident event.

It is an object of the present invention to provide a control system that can monitor a performance of various accessories relating to the operation of a parking barrier, and determine and report any detected faults in the performance of the accessories.

It is an object of the present invention to provide a control system that can disable certain defective accessories, so that the operation of the barrier is restored to a functional state, albeit not a fully functional state.

It is an object of the present invention to provide a control system that will remind authorized personnel, such as an attendant or a remote service facility, that certain defective accessories have been disabled and need to be repaired.

It is an object of the present invention to provide a control system, which can detect fraudulent activity by a parking area attendant Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
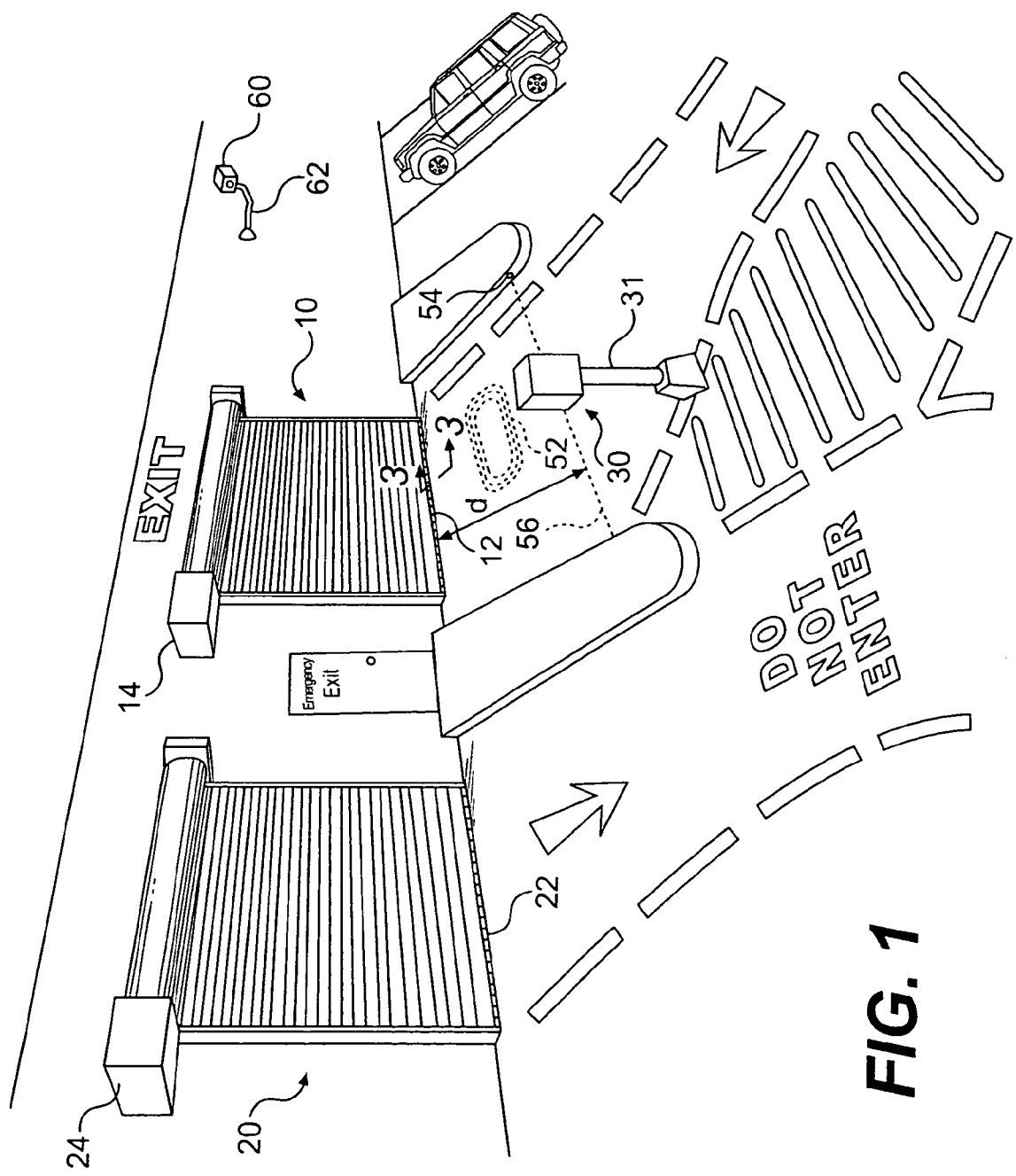
FIG. 1 is a perspective view of an interior portion of a parking garage's entrance/exit area.

FIG. 1 illustrates an interior view of a parking garage, in accordance with the present invention. A first barrier 10 is provided for blocking an exit from the parking garage. A second barrier 20 is provided for blocking an entrance to the parking garage. A first actuator 14 is provided for controlling movement of the first barrier 10. Likewise, a second actuator 24 is provided for controlling movement of the second barrier 20.

As illustrated in FIG. 1, the parking garage is controlled by automated machinery, in the form of a first customer terminal 30 and a second customer terminal provided on the other side of the second barrier 20 (not shown in FIG. 1). When a customer's vehicle approaches the exit of the parking garage, the customer must stop at a customer acknowledgement device, such as the first customer terminal 30. The first customer terminal 30 is provided on pole 31, or similar structure, so that the first customer terminal 30 is presented to a driver's window of the vehicle.

Figure 2:
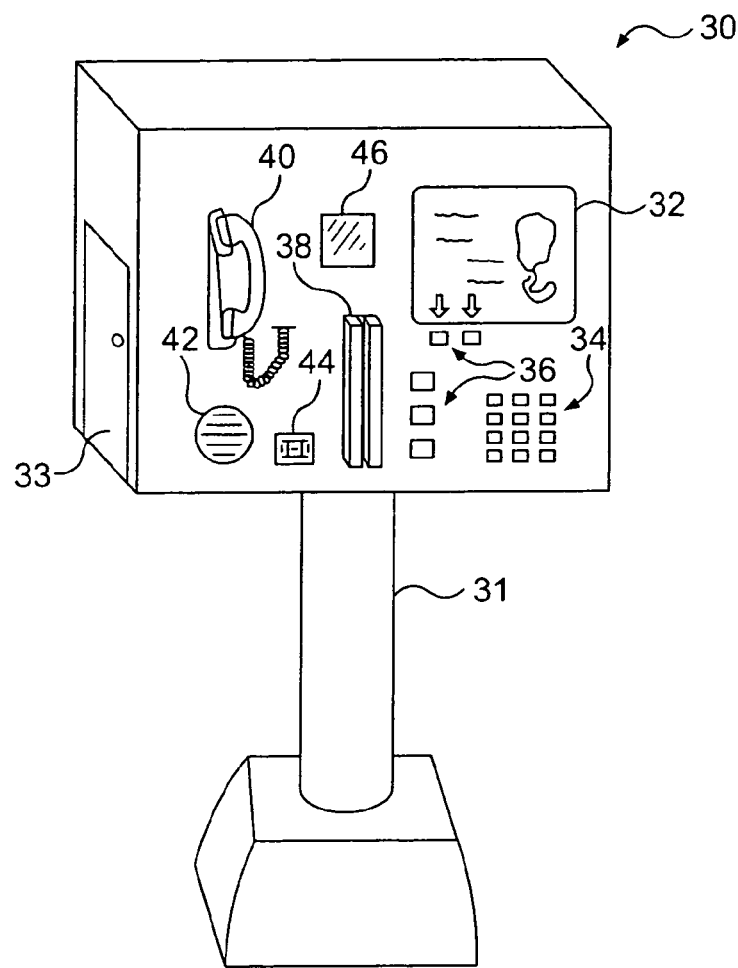
FIG. 2 is a perspective view of a customer terminal.

FIG. 2 illustrates the front face of the first customer terminal 30 or virtual attendant, which is presented to the driver. The first customer terminal 30 includes a display screen 32, such as a liquid crystal display (LCD) or vacuum fluorescent display (VFD), a multi-key touch pad 34, a plurality of function keys 36, and a card reader 38. The first customer terminal 30 also includes a standard telephone handset 40, and/or a speaker 42 and microphone 44, so that two-way voice communication may occur. Optionally, the first customer terminal may include a video camera 46, so that visual images may be one-way communicated from the first customer terminal 30, or two-way image communication may occur in conjunction with the display screen 32. The second customer terminal would be of similar design.

As illustrated in FIG. 1, one or more vehicle acknowledgement devices, such as a vehicle presence detector, are provided in proximity to the first customer terminal 30. For example, a loop sensor 52 for sensing metallic content may be embedded in the surface of the exit ramp. Alternatively, one could employ a weight-activated sensor. FIG. 1 also illustrates an electric eye system 54 for detecting the presence of a vehicle, which may be employed in combination with, or instead of, the loop sensor 52.

A passing vehicle is detected by the electric eye system 54, when a light beam 56, such as an infra red light beam, is obstructed by the vehicle. The loop sensor 52, electric eye 54, and/or other vehicle presence detector is located a predetermined distance from the first barrier 10. For example, in FIG. 1, the light beam 54 is located a distance "d" from the first barrier 10.

A first video camera 60 is mounted on a post 62 proximate the first barrier 10. The first video camera 60 is pointed in a direction to capture an image of the first barrier 10 and an area upstream and adjacent to the first barrier 10. The first video camera 60 may alternatively be mounted in a position, which can also capture an image of a license plate of a vehicle at the first barrier 10. The first video camera 60 may be capable of capturing a single still image, or a time sequence of images. A similar second video camera (not shown in FIG. 1) is provided to capture an image of the second barrier 20 and an image of a license plate of a vehicle at the second barrier 20.

The first barrier 10 includes a first edge sensor 12 disposed on its leading edge. The first edge sensor 12 may be continuously present along the entire leading edge of the first barrier 10 (as illustrated in FIG. 1), or may be present over only a portion or portions of the leading edge of the first barrier 10. A second edge sensor 22, like the first edge sensor 12, is provided in a similar manner with respect to the second barrier 20.

Figure 3:
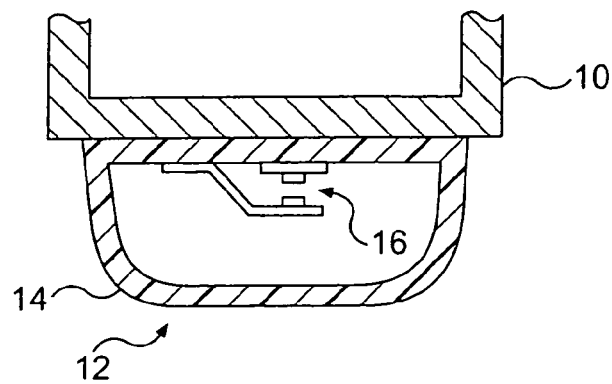
FIG. 3 is a cross-sectional view taken along line 3—3 in FIG. 1.

FIG. 3 illustrates a cross-sectional view of the first edge sensor 12, taken along line 3—3 in FIG. 1. The first edge sensor 12 includes a flexible membrane 14 enclosing an elongated contact switch 16, or a plurality of contact switches 16. Pressure on the leading edge of the first barrier 10 causes the contact switch 16 to close.

Of course, other types of switches or sensors could be substituted for the contact switch 16. For example, the flexible membrane 14 could be fluid-filled and a pressure sensitive switch could then sense increased fluid pressure caused by contact occurring at any point along the first edge sensor 12. As another example, an electric eye may be provided to send an infrared light beam through the flexible membrane 14, or immediately in front of the leading edge of the first barrier 10, if no flexible membrane 14 were provided. By this arrangement, any obstacle immediately in front of the leading edge of the closing first barrier 10 will be automatically detected when the light beam is broken.

Figure 4:
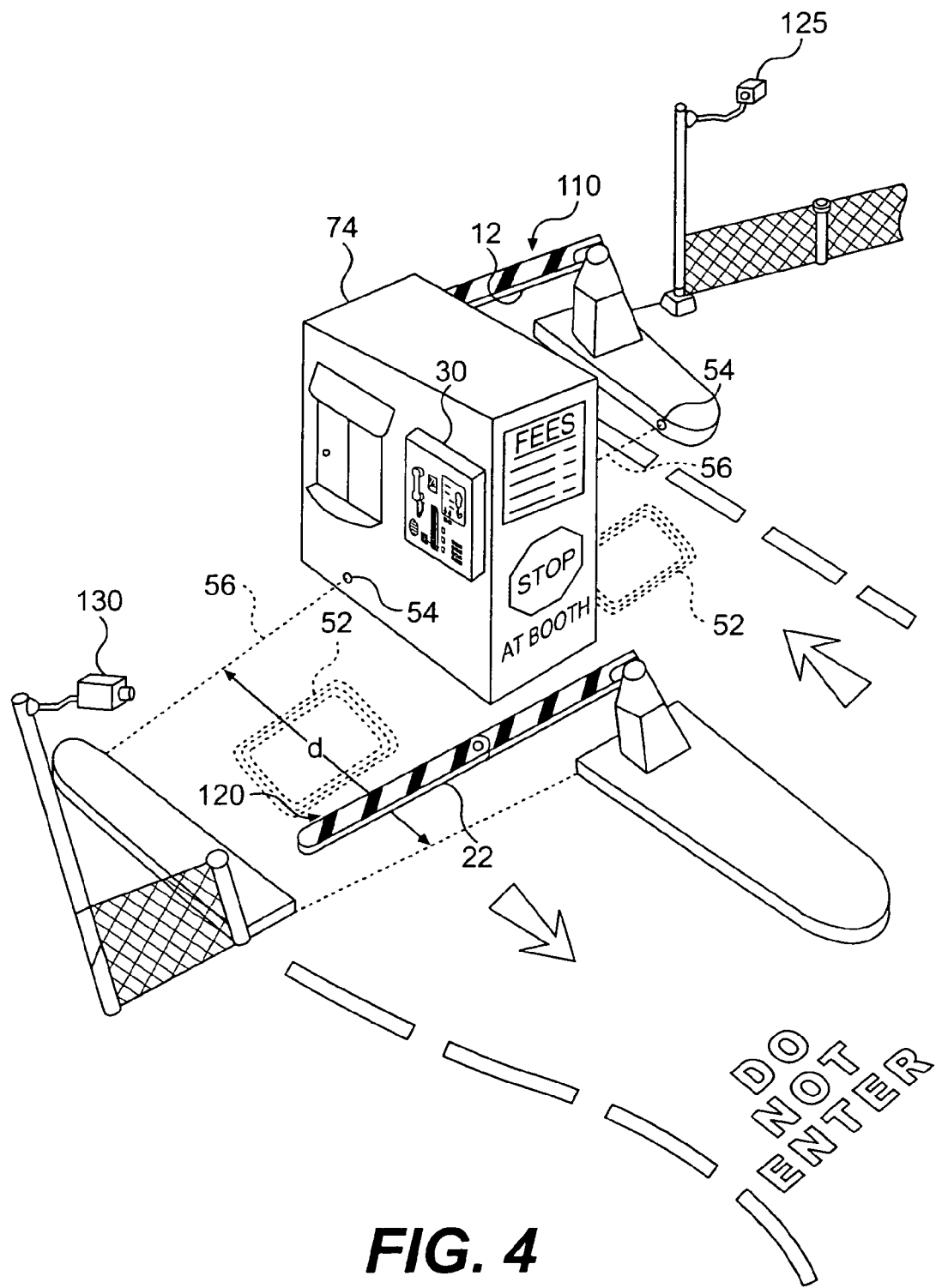
FIG. 4 is a perspective view of a parking lot's entrance/exit area.

In FIG. 1, the first and second barriers 10, 20 are depicted as overhead, rolling-type doors, however other types of barriers could be employed. For example, FIG. 4 illustrates an outdoor parking area having a third barrier 110 and a fourth barrier 120, in the form of crossing arms. The outdoor parking area also includes an attendant booth 74. Of course, the indoor parking area of FIG. 1 could also have included an attendant booth.

In FIG. 4, the attendant booth 74 allows the parking area to be manually managed by a parking lot attendant during peak usage hours. For example, a parking lot attendant may be present from 7 am until 6 pm Monday through Friday, and absent at all other times. Inside the attendant booth 74, there are at least two push buttons 78 (see FIG. 5). Pressing one of the push buttons 78 associated with the third barrier 110 will cause the third barrier 110 to open and later close. Pressing another of the push buttons 78 associated with the fourth barrier 120 will cause the fourth barrier 120 to open and later close.

Also, in the attendant booth 74, there is provided mode switch 76. The mode switch 76 allows the attendant to select a mode of operation for the parking area and is not limited by the following modes. As an example, in one mode, the opening of the barriers 110, 120 is controlled via the push buttons 78 (See FIG. 5). In another mode of operation the barriers 110, 120 stay open continuously. In yet another mode of operation, the parking area is controlled by the automated customer terminals 30.

In FIG. 4, a third camera 125 is provided to capture images of the third barrier 110 and the area adjacent and upstream to the third barrier 110. A fourth camera 130 is provided to capture images of the fourth barrier 120 and the area adjacent and upstream to the fourth barrier 120. The third camera 125 and fourth camera 130 are advantageously positioned so as to capture an image of a vehicle's license plate at the third and fourth barriers, respectively. The structural features concerning the vehicle detectors, such as the electric eye system 54 and loop sensor 52, are similar in layout to the arrangement illustrated in FIG. 1.

Figure 5:
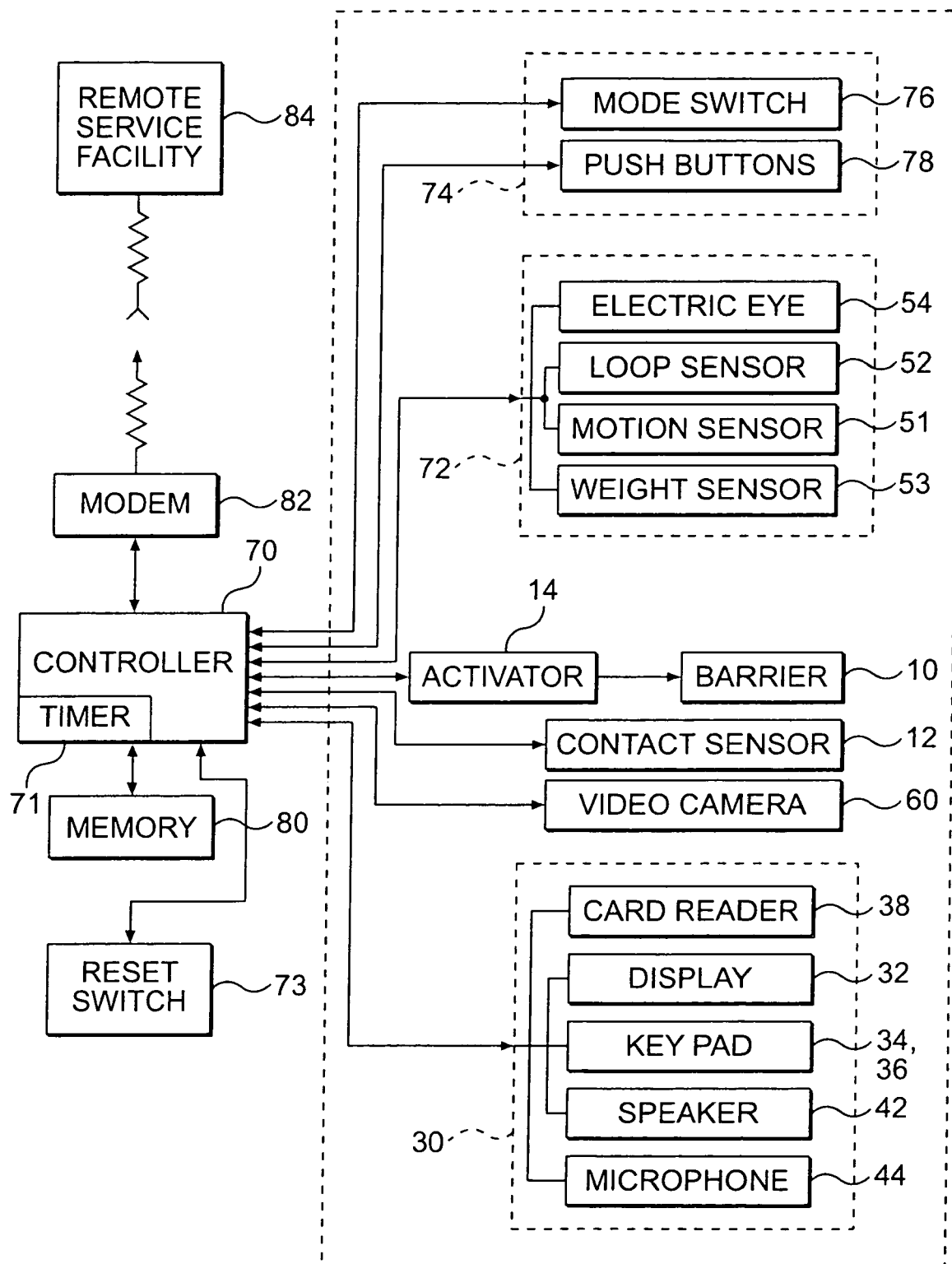
FIG. 5 is a block diagram illustrating various component of a control system of a parking area.

FIG. 5 illustrates a block diagram of a control system for the present invention. FIG. 5 illustrates a first controller 70, which manages the operations associated with the first barrier 10. Of course, a second controller 70 would manage the operations associated with the second barrier 20 and second customer terminal. Other barriers would have their own associated controllers, customer terminals, and attendant booths of the parking area. A modem 82 is connected to each controller 70. The modem 82 allows the controller 70 to communicate with a remote service facility 84.

Memory 80 and timer 71 are an integral part of the controller 70. The memory 80 stores events, alarms and warnings as they occur, complete with a time stamp. The events, warnings and alarms can be sent, via the modem 82, to the remote service facility 84. The internal timer 71 is used for various purposes to control the barrier and determine fault conditions.

The features of the first customer terminal 30 are connected to the controller 70 via hardwiring or a wireless connection. Further, the first actuator 14 for causing movement the first barrier 10 is connected to the controller 70. The first edge sensor 12 and the first video camera 60 are also connected to the controller 70. One or more vehicle detectors 72 (such as the electric eye system 54, the loop sensor 52, a motion sensor 51, and/or a weight sensor 53) are connected to the controller 70.

The attendant's booth 74 includes controls, which are manually operable by the attendant, such as the mode switch 76, the push buttons 78 and a reset switch 73. The push buttons 78 are momentary switches, which if pressed by the attendant, cause one of the barriers to cycle, i.e., open and close. The mode switch 76 is used to set the operation mode of the parking area. For example, when the mode switch 76 is in the "day" mode, the attendant controls the barriers by using the push buttons 78. When the mode switch 76 is in the "free" mode, the barriers remain open, so that vehicles may pass by freely. Alternatively, when the mode switch 76 is in the "automated" mode, the automated features of the customer terminals 30 are used to control operation of the barriers. The controller 70 will record the date and time when a particular mode was selected and store this data in the memory 80.

As illustrated in FIG. 5, the connections between the controller 70 and the various accessories concerning the operations of the barrier 10 are two-way connections. In other words, the controller can both send to, and receive signals from, the various accessories. In a preferred embodiment, the circuitry employed in the various accessories, such as the electric eye 54, actuator 14, card reader 38, etc. include self-diagnostic circuitry. The features of self-diagnostic circuitry are known in the existing arts, and reference can be had to the existing arts to determine the various constructions and operations of such self-diagnostic circuits.

During operation, the controller 70 will monitor the performance of the various accessories and determine whether the accessories are functioning properly. If a malfunction occurs during the operation of one of the barriers attached to the controller 70, the controller 70 will report the fault occurrence and identity of the faulty accessory to the central service facility 84 via the modem 82. Alternatively or in addition, the controller 70 maintains a fault log in the memory 80, when a parking attendant enters a command via the keypad 34 on the customer terminal 30, the fault log could be displayed on the LCD screen 32.

Sending fault data via the modem 82 provides a means by which the parking service company can be immediately informed of malfunctions in a parking barrier, so as to incur a minimal loss of parking revenue. Further, the parking service company will know the nature of the fault and will be able to dispatch only the necessary service personnel to correct the fault. Likewise, providing the display of the fault to a parking attendant on the premises, via the LCD screen 32, will enable the parking attendant to call only the necessary service personal.

With reference to the flow chart of FIG. 6, an example of an operational embodiment of the present invention will be described. Of course, the operation can be varied within the spirit and scope of the present invention, and therefore FIG. 6 should not be construed as limiting to the claimed invention. For simplicity of illustration, the flow chart illustrates a sequence of operations concerning an accident event logging and recording system for the first barrier 10. Of course, in practice, the system would log and record accidents, which occur with any of the entrance or exit barriers of the parking area.

In step S100, the system is in a ready state. In the ready state, the first barrier 10 is blocking the exit of the parking garage. The controller 70 awaits an interrupt signal. The interrupt signal indicates the presence of a vehicle. For example, one of the vehicle detectors 72 senses a vehicle, or an input is received by the first customer terminal 30. Once an interrupt signal is received, operation proceeds to step S102.

In step S102, data is accepted from the first customer terminal 30. For example, the customer reads instructions from the display 32, and inputs a pass code via the keypad 34. Alternatively, the customer may swipe a credit card or parking pass through the card reader 38, or may communicate with a parking garage attendant or the remote service facility 84 via the microphone 44 and speaker 42.

Based upon the data received in step S102, in step S104, the controller will analyze the input data, and/or any data received from the parking garage attendant or remote service facility 84, and determine whether the data is sufficient. If the data is insufficient, processing goes to step S106. In step S106, the parking garage attendant is called to assist the customer, or the customer is directed to return to the parking garage and seek the assistance of a parking garage attendant. Then, the system returns to the wait state of step S100.

If the data in step S104 is sufficient, processing proceeds to step S108. In step S108, the controller 70 begins to receive video images from the video camera 60. Next, processing goes to step S110 where the controller sends a signal to the first actuator 14 indicating that the first barrier 10 should start opening.

Next, in step S112, the controller monitors the outputs of the vehicle detector 72 to determine when the vehicle reaches the vehicle detector 72. The action of the vehicle reaching the vehicle detector 72 is "an event," which is time stamped and stored in memory, in step S114. In fact, every action in the system is an event which is time stamped and stored in memory, such as activation of a push button, a mode switch, a sensor or a safety edge. The events are stored in a current event log. If the completed cycle is normal, the current event log is cleared when the door is fully closed again. If a special occurrence happens, such as an alarm, failure or activation of the safety edge, then the current event log is moved to a history event log for later scrutiny. The history event log is not erased without special clearance, such as a password known only to authorized service personnel.

Next, in step S116, the controller samples the vehicle detectors 72 to determine whether or not the vehicle has completely exited the parking garage. If the vehicle detectors 72 indicate that the vehicle has not yet completely exited the parking garage, the controller 70 checks to see if the first edge sensor 12 has detected contact between the customer's vehicle and the leading edge of the first barrier 10 (step S118).

If the vehicle has completely exited the garage in step S116, processing proceeds to steps S120 and S122. In step S120, the first barrier is closed, and in step S122, the current event log and the video images are erased, or flagged to be overwritten. Next, processing returns to step S100.

If contact is sensed in step S118 via an edge sensor or electric eye in the plane of the door, processing proceeds to step S124. In step S124, the current event log is moved to the history event log. Next, in step S125, a position of the first barrier and movement direction of the first barrier, when the first barrier was hit, are determined. This may be accomplished by providing encoding marks on a shaft, which rotates in a first direction as the first barrier 10 is opening, and which rotates in a second, opposite direction as the first barrier 10 is closing. The position and movement direction of the barrier are also recorded in the current event log, which was moved to the history event log.

The encoding marks on the rotating shaft can be read and counted by an encoding reader to determine the position of the first barrier 10, the direction of movement of the first barrier 10, and even the speed of movement of the first barrier 10. Encoders for determining the rotations position, direction, and speed of a rotating shafts, are known in the art outside of parking garage and fire door actuators, such as in the servo control systems art.

Next, in step S126, the parking attendant, and/or the remote service facility 84, is notified about the physical contact between the vehicle and the first barrier 10. Next, in step S128, the video images recorded by the video camera 60 and information concerning the vehicle/driver that actuated the barrier (e.g., parking card number, credit card number, etc. as provided to the customer terminal 30) are stored in the memory 80 and/or transmitted to the parking attendant and/or the remote service facility 84.

Of course, whenever the contact sensor 12 senses contact to the first barrier 10, movement of the first barrier 10 is stopped. Stopping the first barrier 10 could be accomplished by a brake, as disclosed in co-pending application Ser. No. 09/644,901. Alternatively, the actuator 14 could be signaled to stop the first barrier 10, and then to open the first barrier 10. In either event, further damage to the vehicle and/or first barrier 10 will be minimized.

Figure 6:
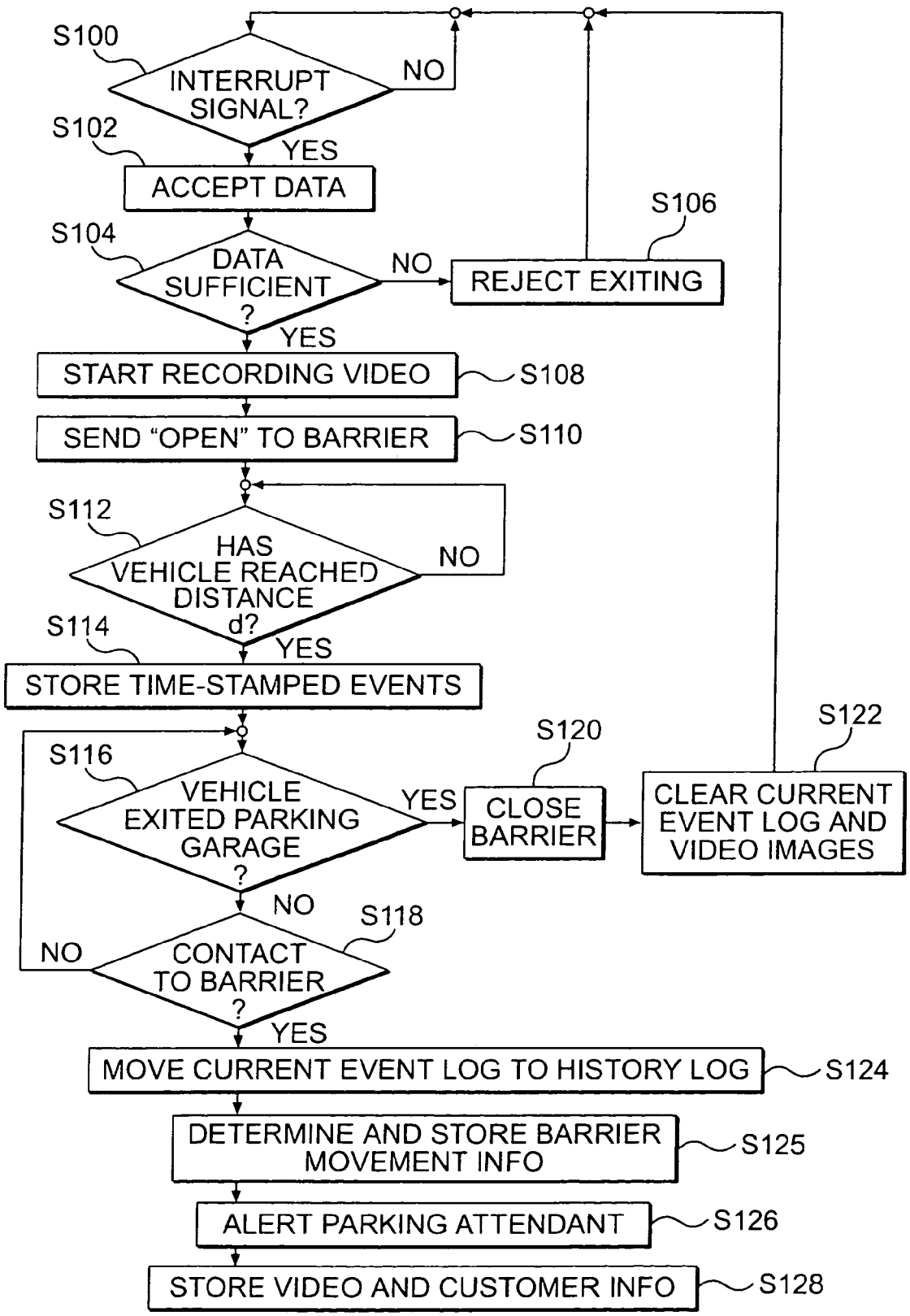
FIG. 6 is a flow chart illustrating a method of operation for the control system of FIG. 5.

In order to simplify the flow chart of FIG. 6, only the control steps concerning the first barrier 10 are discussed. In practice, another controller 70 would control and monitor the operation of the second barrier 20, and other controllers would control any other barriers of the parking garage. Like controllers would be used to control and monitor the third and fourth barriers 110, 120 of the parking lot of FIG. 4, and any other barriers used at the parking lot of FIG. 4. It is intended that the remote service facility 84 would service many controllers 70 located at many parking garages and/or lots.

The operational method depicted in FIG. 6 is only one possible embodiment of the present invention. The operational method may be modified in many ways. The order of the steps could be altered. For example, steps S124, S125, S126 and S128 could occur in reverse order, or in any other order, such as S125, S128, S124, and then S126.

The control method depicted in the flow chart of FIG. 6 may be modified in many other ways, while remaining within the spirit of the present invention and scope of the attached claims. For example, step S122 could be optional. Under some circumstances, it may be desirable to store video images of the activities relating to a parking entrance or parking exit indefinitely, or for some length of time regardless of whether or not an accident event occurred.

Of course, the sampling of the vehicle detectors 72 (step S116) and the first edge sensor 12 (step S118) could be carried out simultaneously, or in a nearly simultaneous manner perhaps in milliseconds. Therefore, the controller 70 would be simultaneously monitoring for the vehicle to exit and for any contact between the vehicle and the first barrier 10.

FIG. 6 indicates that the control system stops after the data concerning the accident has been recorded. Presumably, the parking garage attendant would inspect the first barrier 10, and if appropriate, reset the system to start at step S100, if the first barrier were still functional.

Steps S124 and S128 indicate that the timer value and video images are stored in memory 80. Alternatively, the timer value and/or the video images could be transmitted via modem 82 to the remote service facility 84 to be viewed, stored and/or processed.

The time stamped events can be used to calculate an estimated speed of the vehicle, as the vehicle approached the first barrier 10. The time stamped events can give a further indication of the movements of the door and the vehicle to establish what happened in the event of an accident.

By the present invention, it is possible to generate an accident log relating to an accident event when a customer's vehicle contacts a parking barrier. The accident log can include data relating to the accident event. The data may include video images of the barrier before, during and after the accident. Further, the data may include the direction of travel of the barrier (e.g., was the barrier going up or down when the contact occurred), the speed of movement of the barrier, and the exact elevation of the barrier when contact was initially made. Moreover, the data can include identification and timing information concerning the vehicle which contacted the barrier, such as the date and time of day when the accident occurred, the parking pass number or billing information that the customer entered into the customer terminal just prior to contacting the barrier, and an estimated speed (albeit not a true speed) of the vehicle when contact was made with the barrier.

The accident event log is a valuable asset to the parking area management company. Such a log may be useful as evidence to establish and/or rebut claims of property damage, personal injury, negligence, etc.

Figure 7:
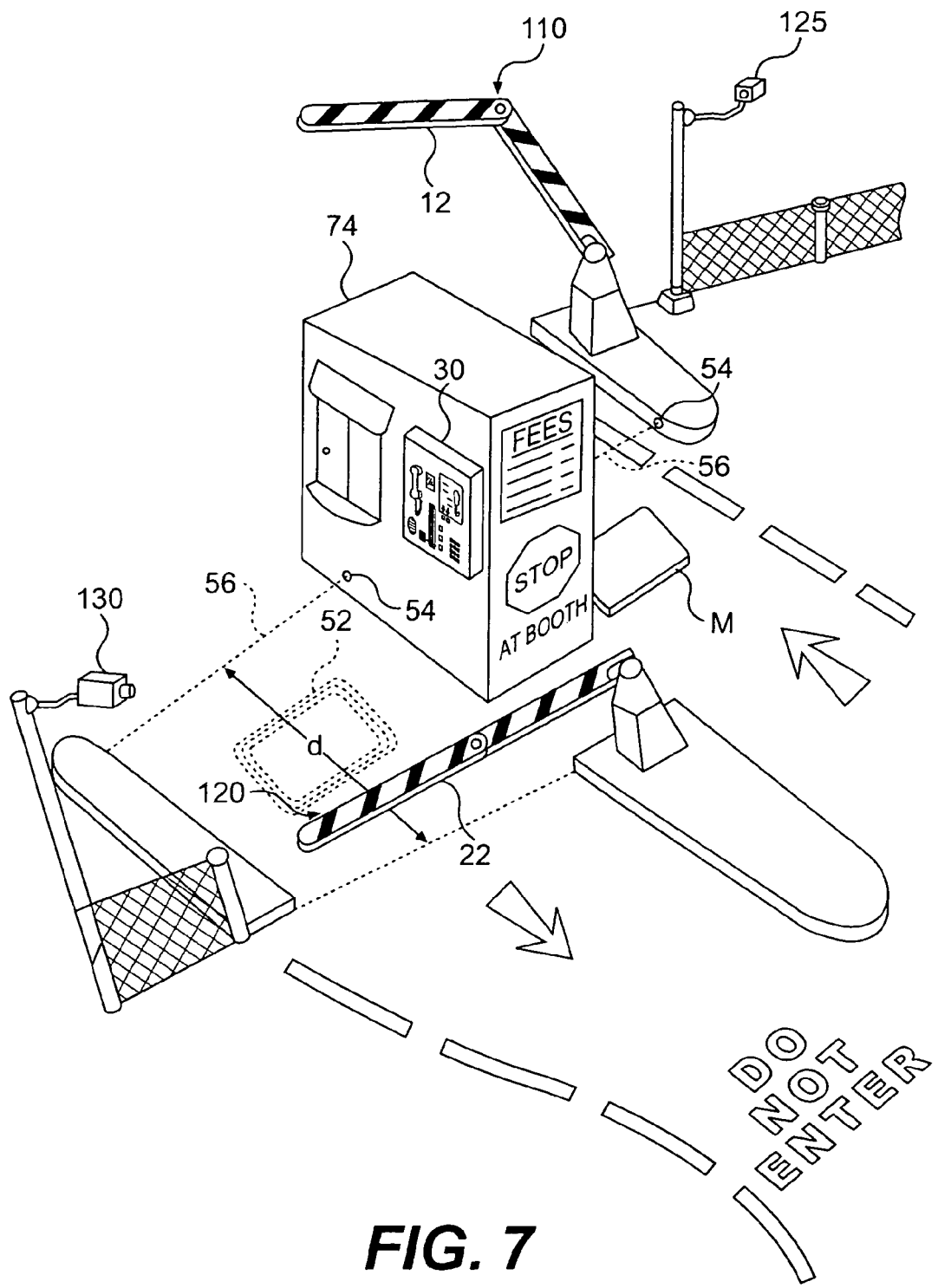
FIG. 7 is a perspective view, similar to FIG. 4, illustrating a fraudulent manner of holding a parking barrier open.

Now, with reference to FIG. 7, an operation of the attendant fraud prevention characteristics of the present invention will be disclosed. FIG. 7 is similar to FIG. 4, except a metal plate M has been placed over the loop sensor 52 associated with the exit of the parking lot by a mischievous parking attendant. The metal plate M will cause the loop sensor 52 to report the presence of a large metal object proximate the barrier 110. The control system will assume that the metal object is a vehicle, and will hold the barrier 110 in its open state to prevent contact between the barrier 110 and the vehicle.

With the barrier staying open, the attendant will collect a parking fee from a customer and allow the customer to exit the parking area. After paying, the customer drives over the metal plate. Usually, the customer fails to see the plate, or simply believes the plate is covering a hole in the exit ramp where some repair work is needed. Therefore, from the customer's perspective, he has paid the appropriate fee and all is well. In point of fact, all is not well. The attendant has pocketed the parking fee, i.e., the attendant has stolen money from the parking management company.

Unfortunately, conventional control systems would not detect the fraudulent activity of the attendant. In a convention control system, the cycles of the barrier (e.g. the number of times a barrier is opened and then closed) are counted. At the end of the accounting period (e.g. shift change, or end of the day), the funds collected by the attendant are compared to the cycle count. Pocketed fees will result in insufficient collected funds. With the metal plate scam, the barrier does not cycle with each passing vehicle. Therefore, the pocketed fees are not detected by the audit.

By the present invention, the controller 70 time stamps events to sense abnormal conditions. For instance, the controller 70 records a time stamp when the loop sensor 52 senses a large metal object. The controller 70 again records a time stamp when the loop sensor 52 no longer senses the large metal object. If the time differential between the two time stamps exceeds a predetermined threshold value (e.g., 40 seconds), an alarm event is triggered. The alarm event indicates that an abnormal condition exists. For example, a vehicle has stalled under or near the barrier, the loop sensor 52 has failed, or someone has placed a large metal object over the loop sensor 52. An alarm event causes the events stored in the current event log to be moved to the history event log.

Figure 8:
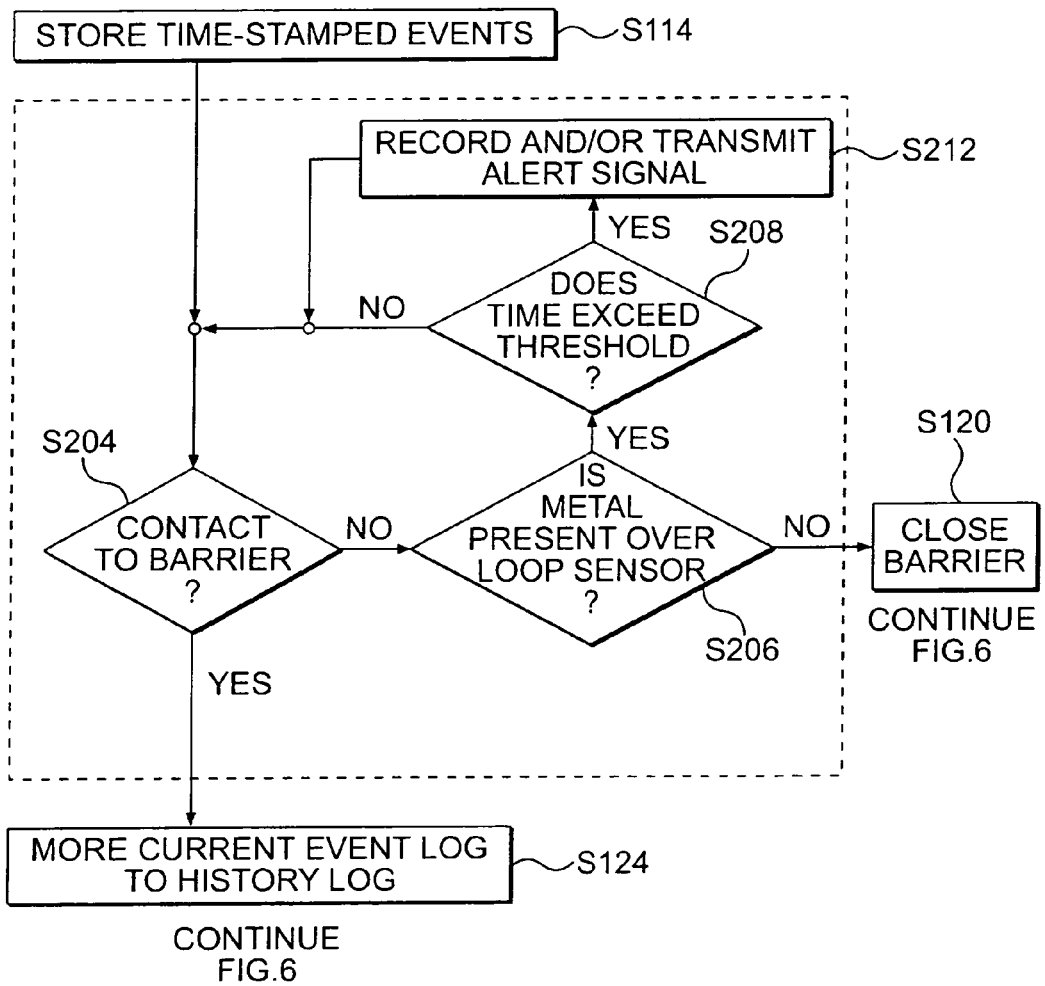
FIG. 8 is a flow chart illustrating additional method steps, which may be employed in the method illustrated in FIG. 6.

FIG. 8 is a flow chart illustrating an embodiment of a control method for the above system. The steps in FIG. 8 could replace the method steps S116 and S118 in FIG. 6. Of course, other method steps could be employed to ascertain whether or not the loop sensor 52 is activated for an excessive span of time.

In FIG. 8, after step S114 of FIG. 6, processing proceeds to step S204. In step S204, the controller 70 checks to see if the first edge sensor 12, or an electric eye, has detected contact between the customer's vehicle and the leading edge of the first barrier 10 (the step S204 is the same as step S118 in FIG. 6).

If contact is sensed in step S204, processing proceeds to step S124, and continues in accordance with FIG. 6. If contact is not sensed in step S204, processing proceeds to step S206. In step S206, the controller 70 checks the output of the loop sensor 52. If a sufficiently strong signal is sensed, a relatively large quantity of metal is proximate the first barrier 10. Normally, this would mean that a vehicle is present. If a weak signal, or no signal, is sensed, little or no metal is proximate the first barrier 10. Normally, this would mean that the vehicle has left the proximity of the first barrier 10.

If in step S206, the controller 70 concludes that the vehicle has exited the proximity of the first barrier 10, processing proceeds to step S120. In step S120, the controller 70 sends a signal to the activator 14 to close the first barrier 10. Processing then proceeds in accordance with the flow chart of FIG. 6.

If in step S206, the controller 70 concludes that the vehicle is still proximate the first barrier 10, the first barrier 10 remains open and processing passes to step S208. In step S208, the controller 70 checks the time stamps and compares a difference in their values to a threshold value. If the threshold value is not exceeded, processing returns, or loops, to step S204.

If the threshold value is exceeded in step S208 the loop sensor 52 has been tripped for an excessive time period. The threshold value may be set at thirty seconds, one minute, or some other appropriate time, which would normally give plenty of time for a person to drive past the parking barrier. Once the threshold value is exceeded, processing goes to step S212. In step S212, an alert signal is recorded in the memory and/or sent to the remote service facility 84. The alert signal indicates that an abnormal event has occurred in that the loop sensor 52 has remained tripped for an excessive time period.

In FIG. 8, the alert signal is first sent to the remote service facility 84, after the loop sensor 52 is tripped for the excessive period of time. Further, the alert signal is repeatedly sent to the central service facility 84 until the loop sensor 52 is no longer tripped. Of course, this process could be modified, such that an alert signal is sent periodically, perhaps in five-minute intervals. Further, the alert signal could be accompanied by the time stamped event, indicated a running total time that the loop sensor 52 is tripped.

The remote service facility 84 will monitor the number of times a day that the loop sensor 52 is tripped for an excessive time period, and also will monitor how long the loop sensor 52 is tripped during each of those time periods. The remote service facility 84 can handle the situation in many ways, such as activating the camera 60 to view the first barrier 10; dispatching a security guard to the first barrier 10 to see if fraud is being committed by the attendant; dispatching a service person to the first barrier 10 to correct the problem; or calling the on-duty attendant to inquire about the problem.

Cumulative data concerning the loop sensor 52 or other accessories can be stored in the memory 80 connected to the controller 70, or in a memory connected to the remote service facility 84. The cumulative data may include the occurrence date and time when the activation period of the loop sensor 52 exceeded the threshold value, and the length of excessive time for each occurrence. Such cumulative data could be accessed on site or remotely via the modem 82. The data may prove useful in determining if a loop sensor 52 failure occurs more often when a certain employee is on duty, and may indicate that a different or new technique of defrauding the auditing system of the controller 70 has been developed and should be investigated.

Now, with reference to FIG. 5, another operation of the attendant fraud prevention characteristic of the present invention will be disclosed. The reset switch 73, connected to the controller 70, is located in the attendant's booth 74. Alternatively, the reset switch 73 could be located behind of a locking panel 33 of the customer terminal 30, which is only accessible by attendant, service personnel and/or a manager (see FIG. 2). The reset switch 73 is preferably a momentary switch that is activated by the attendant pressing the switch. Alternatively, the reset switch 73 could be a solenoid, which is closed by the controller 70, if an appropriate code is punched into the key pad 34, or which is closed in response to a signal from the remote service facility 84 (i.e. a remote reboot signal).

The present invention may also include an automatic reboot feature. The controller 70 will monitor an output signal of the card reader 38. If the output signal length surpasses a threshold time (e.g. three seconds), the controller 70 will send a reboot signal to the reset switch 73 causing an automatic reboot. The controller 70 will block or not send, any reset signal or pulse to an actuator of a barrier that would normally open the barrier. Further, the controller 70 will log the sequence of events into a maintenance log.

In the conventional control systems, resetting a card reader caused all of the systems to reset, such that a pulse was sent to the actuator of the barrier, causing the barrier to open. A dishonest parking attendant could collect parking fees from parking customers and press the reset button to open the barrier. The fraud was difficult to detect because the conventional parking control system's auditing program did not count barrier openings due to reset commands.

By the present invention, if the card reader 38 locks-up, the card reader can be reset by the attendant or remote service facility 84 or automatically, without resetting unrelated sub-systems (components and software) of the control system, and hence without opening the first barrier 10. This will prevent a dishonest attendant, from bypassing the auditing system by letting paying vehicles past the first barrier 10 simply by pressing the reset switch 73.

The remote service facility 84 may activate the camera 60 to view the card reader, and ascertain if any fraudulent activity or foul play is afoot. Further, the control system of the present invention logs a time stamp of when the reset switch 73 is activated in the warning and alarm event log. The logged data may be later retrieved, either on site or remotely via modem, to determined if the card reader 38 is malfunctioning frequently and needs to be serviced. Further, the date and time of the resets recorded help to determine if a certain employee is resetting the card reader excessively or if there was just cause in requiring a reset. If so, further investigation may be needed to see if a new scheme to defraud the auditing system has been developed.

As demonstrated by the disclosure above, the control system of the present invention provides an intelligent or smart system for controlling various parameters of a parking area's various barriers. The control system is completely interactive with the remote service facility 84, via a cellular phone connection, Internet connection, etc. The remote service facility 84 can "call-up" the controller 70 and change the programming, suspend the programming, or alter operational parameters.

As examples, the remote service facility 84 could lock the first barrier 10 into an open position (free parking), or lock the first barrier 10 into a closed position (security lockdown to lock in a stolen vehicle). The remote service facility 84 could reprogram threshold values. For instance, the excessive value judged in step S208 in FIG. 8 could be changed to forty-five seconds or one hundred seconds, or the card reader 38 may be reset twice in twenty-four hours before an alert signal is sent to the remote service facility 84.

The ability to remotely reprogram is particularly advantageous when a component of a sub-system fails. For example, if the contact sensor 12 fails (e.g. constantly indicates that the leading edge of the first barrier 10 is contacting something), the control system would normally leave the first barrier 10 open until the fault is corrected. By the present invention, the control system would report the faulty equipment to the remote service facility 84, and the remote service facility 84 would have the option to temporarily reprogram the controller 70 to ignore the contact sensor 12. After all, the contact sensor 12 is an added safety feature, not a required safety feature. This would allow the first barrier 10 to return to a functional state, albeit not a completely functional state.

As another example, if the card reader 38 locks-up, the attendant can press the reset switch 73. Alternatively, the remote service facility 84 can remotely cause a reset of the card reader 38. Assuming that the reset of the card reader 38 fails, the remote service facility 84 can reprogram the controller 71 to lock the first barrier 10 open, so that vehicle can exit freely until the card reader 38 is repaired.

Unfortunately, leaving the first barrier 10 locked open can be a security concern, particularly in a parking garage. Therefore, in a preferred embodiment, the first barrier 10 would be normally closed, and a message would be presented on the display 32 of the customer terminal 30 stating that the card reader 38 needs repair and instructing the first customer that the first barrier 10 will automatically open when the vehicle proceeds forward. Then, the electric eye system 54 or loop sensor 52 could be used to sense the approach of the vehicle. When the vehicle is sensed, the first barrier 10 would be opened.

Of course the remote reprogramming which is possible via the remote service facility 84, could also be possible on site, via the first customer terminal 30. For example, if an appropriate security code is entered via the key pad 34, a system programming menu could be presented on the display 32. The system programming menu is preferably a windows type program, which allows the system parameters and functions to be easily adjusted, reset, overridden, disabled, etc.

One drawback of allowing the remote, or on site, modification of the system programming is that certain malfunctioning features of the barrier may be overridden and then forgotten. This is particularly a concern with safety features, such as the contact sensor 12. Therefore, the control system of the present invention may include a timed, default-restart subroutine. In other words, whenever a predetermined period of time elapses (e.g., twenty-four hours), the control system will revert back to the factory parameters and software. For example, if a fault occurred with the contact sensor 12, and the contact sensor 12 was disabled, after some period of time, the system would reset to the original parameters.

The contact sensor 12 would, of course, still be faulty. Therefore, a signal would again be sent to the remote service facility 84 indicating the faulty contact sensor 12. By this arrangement, the control system automatically reminds the remote service facility 84, and eliminates the problem of forgetting about faulty, disabled equipment.

In the description and claims, the terms "barrier," "door" or "gate" are broad terms, and should be interpreted to cover any structure used to block entrance, exit, access, and/or view through any type of portal, throughway, or frame. In other words, the terms should encompasses such structures as: a pivoting or sliding solid single panel structure (e.g., a building's front door); a roll-up structure (e.g., a fire door or standard overhead rolling door commonly used in warehouses, loading docks, and at entrances and exits of some indoor parking garages); a gate (e.g., commonly employed at outdoor parking lot's entrances/exits and railroad crossings); a security grill, such as an open mesh-type barrier which allows an air flow to pass freely, yet obstructs access (e.g., as used to lockup customer service counters, and at entrance/exits of some indoor parking garages); or any other type of barriers, such as a slide gates, barrier arms, swing gates, rolling doors and grills and security barriers.

In this application, the various forms of the words "connect," "communicate" or "transmit" are intended to encompass all known forms of signal connection or communication. For example, hardwired, wireless regardless of frequency, optical, infrared, analog, digital, via the internet, etc. Further, the term "modem" is intended to encompass any device facilitating a "communication," as defined above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A combination comprising:
   a barrier for blocking an entrance or exit of a parking area;
   an actuator connected to said barrier for moving said barrier;
   a contact sensor for said barrier;
   a controller connected to said actuator and said contact sensor; and
   a reset switch associated with said controller, wherein activation of said reset switch results in said controller reporting faulty equipment to a remote service facility for temporarily reprogramming the controller to ignore the contact sensor.

2. The combination of claim 1, wherein the controller creates an alarm and/or event log.

3. A parking area management control system having an automatic reboot feature, comprising:
   a barrier;
   a barrier actuator;
   a card reader for generating an output signal;
   a reset switch for the card reader;
   a controller to monitor an output signal of the card reader and to determine the output signal length;
   wherein, if the card reader output signal surpasses a threshold time, the controller sends a reboot signal to the reset switch to cause an automatic reboot and, the controller blocks, or does not send, a reset signal or pulse to the barrier actuator that would open the barrier.

4. The system of claim 3, further comprising, a maintenance log and;
   wherein the controller is adapted to log a sequence of events into the maintenance log.

5. The system of claim 3, further comprising a hit log.

6. The system of claim 3, further comprising a history event log.

* * * * *